United States Patent
Lyle et al.

(10) Patent No.: US 7,383,310 B1
(45) Date of Patent: Jun. 3, 2008

(54) METHOD ALLOWING PARTICIPANT IN A CHAT SESSION TO USE EITHER PRIVATE TAG OR PUBLIC TAG TO MANAGE CHAT HISTORIES

(75) Inventors: Ruthie D. Lyle, Durham, NC (US); Arthur R. Francis, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/939,628

(22) Filed: Nov. 14, 2007

(51) Int. Cl.
*G06F 15/16* (2006.01)
(52) U.S. Cl. .................... 709/207; 709/204; 713/161
(58) Field of Classification Search ............. 709/207, 709/204; 713/160, 161, 176; 370/352; 379/202.01; 340/572.1; 707/5; 702/20; 358/520
See application file for complete search history.

(56) References Cited

U.S. PATENT DOCUMENTS

| | | | |
|---|---|---|---|
| 5,646,752 A * | 7/1997 | Kohler et al. ............... | 358/520 |
| 6,757,827 B1 * | 6/2004 | Geist ........................... | 713/176 |
| 2002/0188409 A1 * | 12/2002 | Gupta et al. .................. | 702/20 |
| 2004/0078596 A1 * | 4/2004 | Kent et al. .................... | 713/201 |
| 2004/0249650 A1 | 12/2004 | Freedman et al. | |
| 2004/0260710 A1 | 12/2004 | Marston et al. | |
| 2005/0235034 A1 | 10/2005 | Chen et al. | |
| 2007/0016575 A1 * | 1/2007 | Hurst-Hiller et al. ........... | 707/5 |
| 2007/0127670 A1 * | 6/2007 | Morishima et al. ..... | 379/202.01 |
| 2007/0250496 A1 * | 10/2007 | Halliday et al. ............... | 707/5 |
| 2007/0273518 A1 * | 11/2007 | Lupoli et al. ............ | 340/572.1 |
| 2008/0019353 A1 * | 1/2008 | Foote ......................... | 370/352 |
| 2008/0066080 A1 * | 3/2008 | Campbell .................... | 719/314 |

FOREIGN PATENT DOCUMENTS

WO          0180214          10/2001

\* cited by examiner

*Primary Examiner*—Le Luu
(74) *Attorney, Agent, or Firm*—Cantor Colburn LLP; Daniel McLoughlin

(57) ABSTRACT

A method of managing chat history on online discussions includes generating a transcript of an electronic discussion between at least two participants and selectively saving the transcript on a computer terminal of one of the at least two participants. The one of the at least two participants saving the transcript establishes a local computer terminal and the other of the at least two participants establishes a remote computer terminal. The one of the at least two participants saving the transcript is prompted to provide a tag. The tag is either a public tag or a private tag. The public tag is associated with the local computer terminal and the remote computer terminal, and the private tag is associated with only the local computer terminal. Once chosen, the tag is incorporated into the transcript.

5 Claims, 4 Drawing Sheets

| Chat History | | | | |
|---|---|---|---|---|
| File Tools Help Tags | | | | |
| asset assurance authentication | Tag Selected: disclosure | | | |
| blog Patents certification | Date ▼ | Start Time | End Time | Initiated By |
| Lotusphere 2007 community | 1/25/07 | 12:42:29 PM | 12:51:03 PM | Arthur R. Francis |
| compliance cryptography | 1/23/07 | 8:18:59 PM | 8:20:38 PM | rlyle@us.ibm.com - Ruthie D Lyle/Raleig |
| development documentation dual- | 1/18/07 | 12:59:15 PM | 11:40:54 AM | Arthur R. Francis |
| stack Ventura enablement | 1/16/07 | 1:13:51 PM | 2:55:49 PM | rlyle@us.ibm.com - Ruthie D Lyle/Raleig |
| evaluation federal Portal | 12/4/06 | 10:38:45 AM | 11:08:54 AM | rlyle@us.ibm.com - Ruthie D Lyle/Raleig |
| government Quickr guidelines | 12/1/06 | 3:03:01 PM | 3:22:03 PM | rlyle@us.ibm.com - Ruthie D Lyle/Raleig |
| ICC implementation information | 11/29/06 | 11:26:33 AM | 2:05:13 PM | rlyle@us.ibm.com - Ruthie D Lyle/Raleig |
| internet Disclosure java JCE | 11/16/06 | 12:07:57 PM | 4:02:08 PM | rlyle@us.ibm.com - Ruthie D Lyle/Raleig |
| JDK JSSE module NIAP | 11/9/06 | 12:01:25 PM | 1:31:53 PM | rlyle@us.ibm.com - Ruthie D Lyle/Raleig |
| performance policy requirements | 11/7/06 | 9:02:24 AM | 10:02:18 AM | rlyle@us.ibm.com - Ruthie D Lyle/Raleig |
| reusable security standards stress | 11/3/06 | 1:33:09 PM | 1:55:24 PM | Arthur R. Francis |
| Web2.0 tools validator wiki wizard | 11/2/06 | 1:00:44 PM | 1:08:06 PM | Arthur R. Francis |
| zOS | 10/30/06 | 10:54:20 AM | 2:00:55 PM | rlyle@us.ibm.com - Ruthie D Lyle/Raleig |

Ruthie D. Lyle
Pervasive Computing Performance Analysis and Test
441-6169 / 1-919-543-6169
I am available @ Durham, NC, US (Sametime 7.5)

rlyle@us.ibm.com  congradulations! Disclose of the qtr.
Arthur R. Francis  which one?
rlyle@us.ibm.com  the one we got the disclosure of the month for we also just got the dis
　　　　　　　　the qtr this is for all of SWG.
　　　　　　　　no $$$ involved though 😊
　　　　　　　　it would be nice to get our little tam together to celebrate over lunch
Arthur R. Francis  great!!
　　　　　　　　is it publish somewhere?
rlyle@us.ibm.com  I got a note from IP
　　　　　　　　you were on copy
　　　　　　　　let me know if you think lunch is appropriate.. and I can see if we can

FIG. 4

METHOD ALLOWING PARTICIPANT IN A CHAT SESSION TO USE EITHER PRIVATE TAG OR PUBLIC TAG TO MANAGE CHAT HISTORIES

BACKGROUND OF THE INVENTION

1. Field of the Invention

This invention relates to methods of managing chat histories or transcripts of an online discussion and, more particularly, to a method of managing chat transcripts using tags that facilitate searching of a number of chat transcripts for a particular chat transcript.

2. Description of Background

Online discussions or chatting is gaining in popularity. Family and friends use various public and private chat protocols to communicate with one another in lieu of using a telephone. Universities and industry also use public and private chat forums to facilitate discussion and collaboration between colleagues. A group of participants such as shown at 2 in FIG. 1 conduct an electronic discussion using a plurality of computer terminals 4-10 connected to a central hub 12. Hub 12 can be an internal or local area network (LAN) or external or wide area network (WAN) hub or the Internet. In addition to connecting through internal and/or external networked hubs, and the internet, participants can access multiple instant messaging accounts from a single instant messaging client that combines multiple instant messaging portals in a single location or interface. In any event, a chat transcript or a recorded history of messages exchanged between two or more chat partners during a chat session may be saved and later recalled using a chat history functionality available in most instant messaging applications. Over time, a user may accumulate a large number of chat transcripts. Searching through the large number of transcripts for a particular transcript can be a tedious, and often fruitless, endeavor.

SUMMARY OF THE INVENTION

The shortcomings of the prior art are overcome and additional advantages are provided through the provision of a method of managing chat histories. The method includes generating a transcript of an electronic discussion between at least two participants and selectively saving the transcript on a computer terminal of one of the at least two participants. The one of the at least two participants saving the transcript establishes a local computer terminal and the other of the at least two participants establishes a remote computer terminal. The one of the at least two participants saving the transcript is prompted to provide a tag. The tag is either a public tag or a private tag. The public tag is associated with the local computer terminal and the remote computer terminal, and the private tag is associated with only the local computer terminal. At this point, the tag is incorporated into the transcript.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 4 illustrates a graphical user interface (GUI) presenting a tag cloud in accordance with an exemplary embodiment of the present invention.

The detailed description explains the preferred embodiments of the invention, together with advantages and features, by way of example with reference to the drawings.

DETAILED DESCRIPTION OF THE INVENTION

Figure 1:
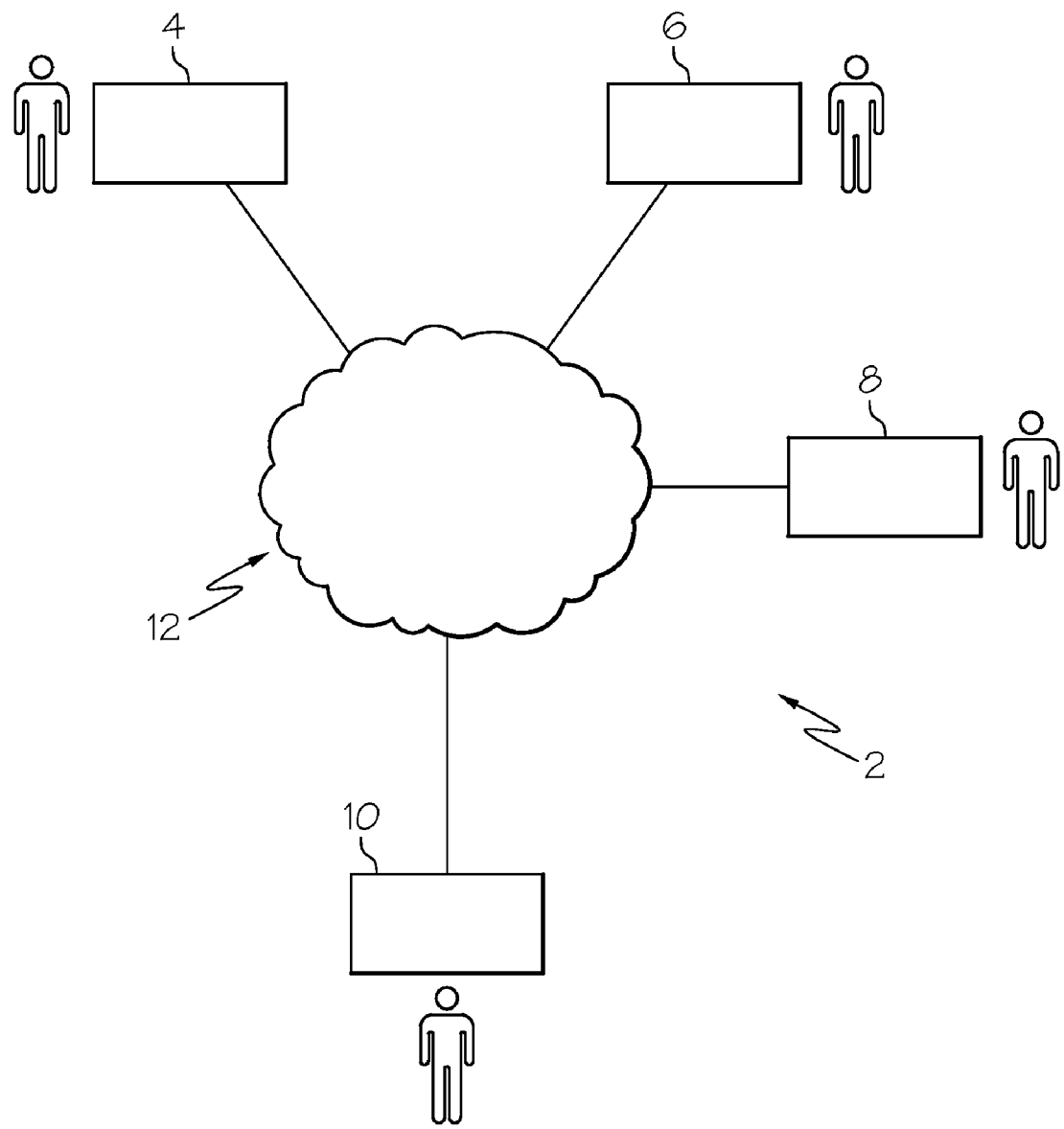
FIG. 1 illustrates a group of participants conducting an online discussion using a plurality of connected computer terminals.
Figure 2:
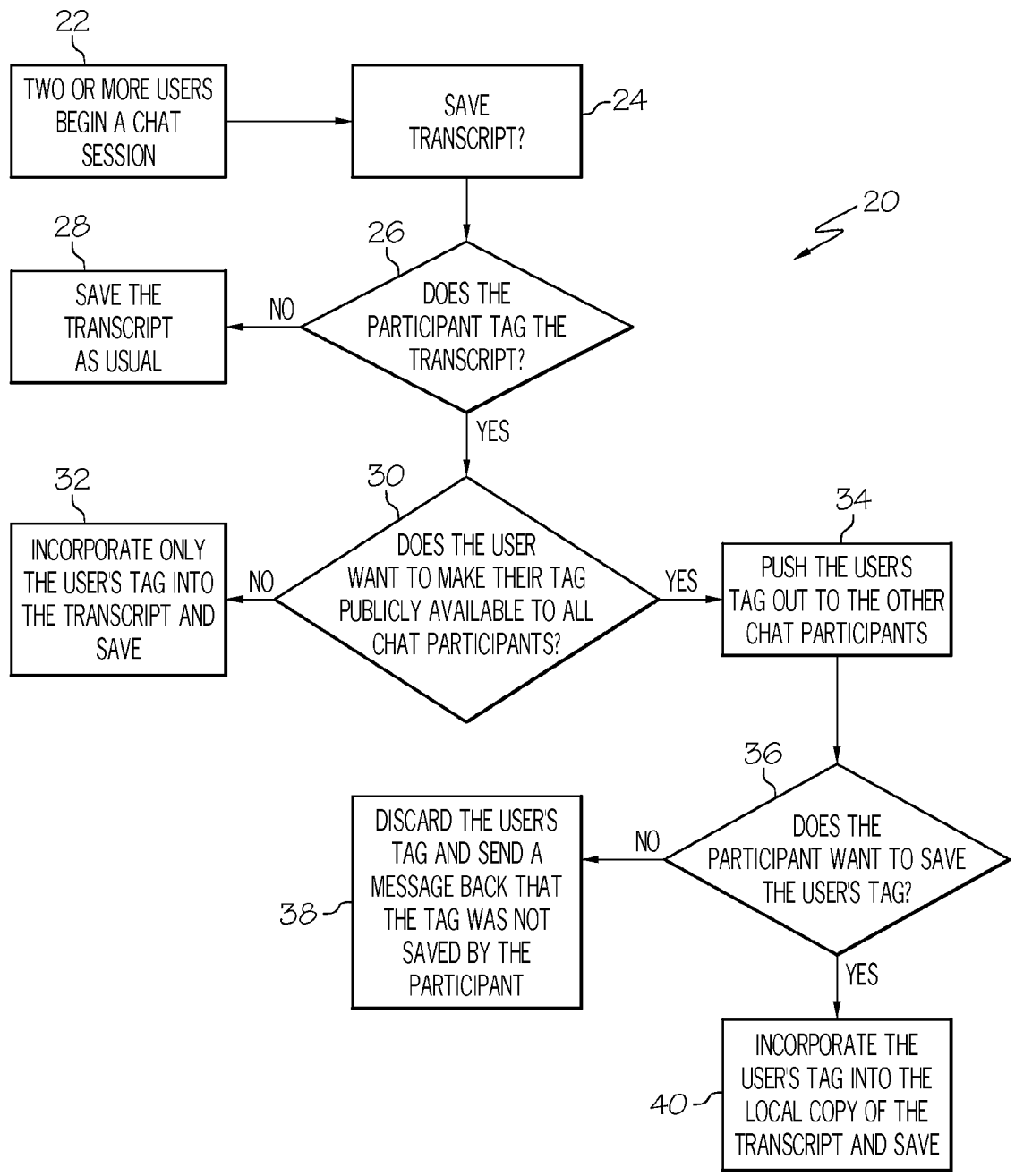
FIG. 2 illustrates one example of a method of managing a chat history in accordance with an exemplary embodiment of the invention.

Turning now to the drawings in greater detail, it will be seen that in FIG. 2 a method of managing track history of online discussion is generally indicated at 20. When two or more users, such as users 4 and 6 in FIG. 1, begin a chat session as indicated in block 22, one of the participants may choose to save a transcript of the dialogue exchanged between the participants in the discussion, as indicated in block 24. After choosing to save the transcript in block 24, the user is presented with an option of providing a tag for the transcript, as indicated in block 26. The tag can be any word, number(s), combination of words, letters and/or numbers that will provide a unique identifier for the transcript. If the participant declines to provide a tag, the transcript is saved in a memory of computer terminal 4 as indicated in block 28. If the participant chooses to tag the transcript, there is presented an option to make the tag a public tag, i.e., available to all chat participants or a private tag, i.e., available only to the participant saving the transcript as indicated in block 30. If the participant chooses a private tag, the tag is incorporated into the transcript and only saved on computer terminal 4 as indicated in block 32.

If the participant chooses to make the tag public, the tag is sent over the network to the other participant(s) in the discussion, as indicated in block 34. At this point, each participant in the discussion is presented with the option of saving the transcript using the tag provided by the participant at computer terminal 4, as indicated in block 36. If other participant(s) declines to save the transcript using the tag, a message is sent back to the participant using computer terminal 4 indicating that the message was not saved, as indicated in block 34. If, on the other hand, the participant(s) choose to save the transcript using the tag, the tag is incorporated into a local copy of the transcript and saved in memory oil the other participants' computer as indicated in block 40. In this manner, the user choosing to initiate the tag establishes a local computer with the remaining members in the discussion defining remote computers such that if a user of the local computer chooses to make a tag public, the remaining participant(s) is/are presented with the option of using the local user's tag to identify their copy of the chat transcript.

Figure 3:
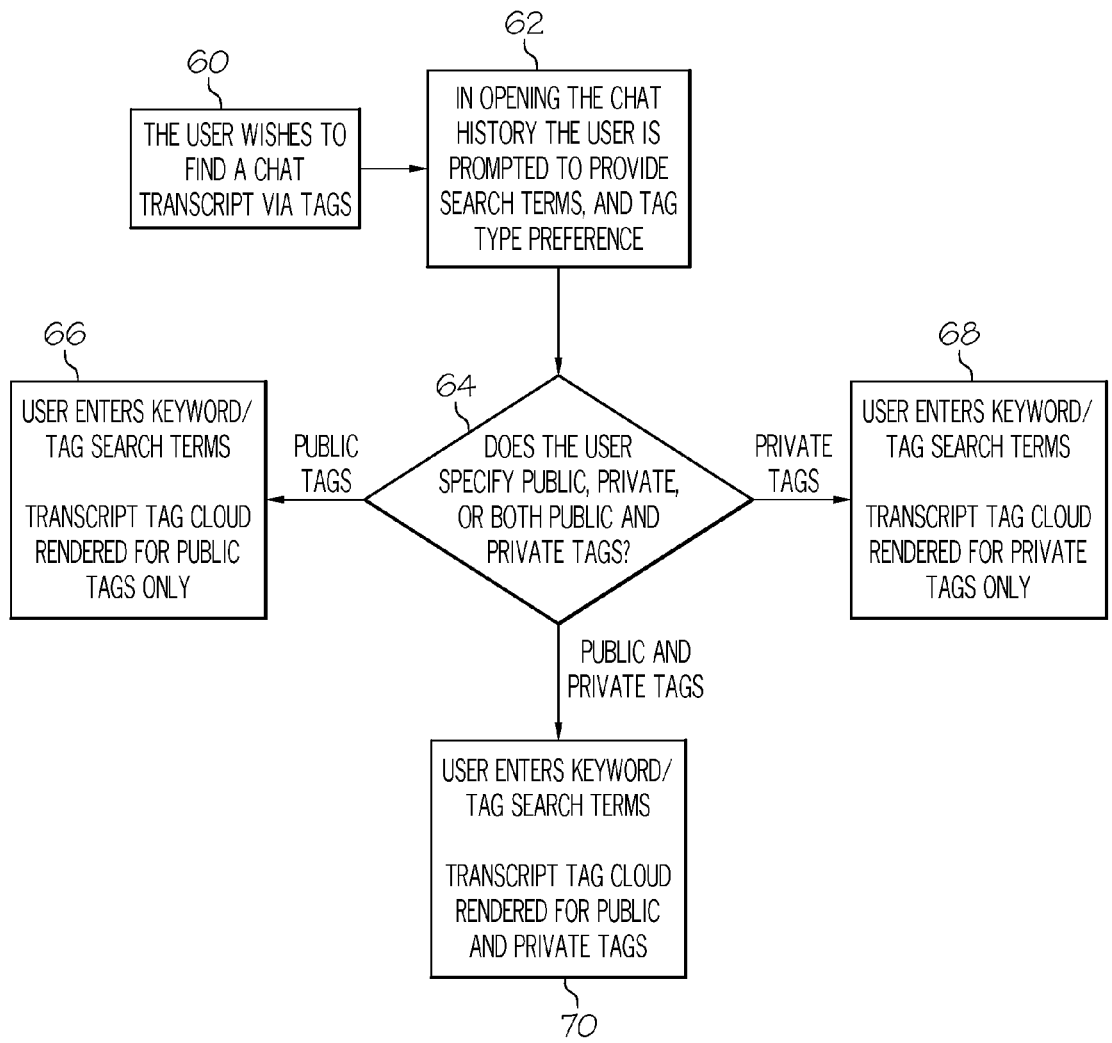
FIG. 3 illustrates one example of a method of searching a chat history in accordance with an exemplary embodiment of the invention.

Once the participant has accumulated a number of chat transcripts that have been tagged, the chat transcripts can be searched for a particular transcript, as indicated in block 60 in FIG. 3. To begin, the participant opens a chat history provided in a chat interface and inputs a search term(s) such as, for example, a keyword(s) and tag type, i.e., public and/or private tags as indicated in block 62. At this point, a determination is made in block 64 whether the participant specified public, private or both public and private tags. If the participant chooses public tags, a transcript tag cloud is rendered for public tags only, the participant then searches the transcript tag cloud including only public tags using keywords/tag search terms as indicated in block 66. If private tags are chosen, a transcript tag cloud is rendered for private tags only. The participant then searches the transcript tag cloud containing only private tags using key words/tag search terms for a particular transcript such as indicated in block 58. Similarly, if both public and private tags are selected, a transcript tag cloud is rendered including both public and private tags with keywords and tag search terms being used to search the transcript tag cloud for a particular transcript.

In accordance with one exemplary aspect of the invention illustrated in FIG. 4, a transcript tag cloud 100 is provided as part of a graphical user GUI interface 104, with private tags presented in a first color and public tags presented in a second color. The tag cloud is presented as a portion of the chat interface or, alternatively, as a fly-out mechanism. Of course, it should be recognized by those skilled in the art that the particular method of presenting the tag cloud can include multiple mechanisms. In addition, when choosing both public and private tags to generate a transcript tag cloud including both public and private tags, the user can toggle between presenting only public or only private tags or both private and public tags. Finally, identity or business card information of the participant that established the tag can be made available by hovering or the like, in the transcript tag cloud. That is, information regarding the participant establishing a particular tag, such as information generally available from an instant messaging client, is incorporated into the tag at the time the tag is captured and made available. This information is then made available or retrievable by, for example, moving a computer cursor over the tag.

At this point, it should be appreciated that the present invention provides a method of managing chat histories that allows a participant of an electronic or online discussion to search through numerous transcripts for particular keywords and or tag terms in order to find a particular chat transcript associated with a particular keyword and or tag. In this manner, chat histories can be referenced for a future use as needed by a participant.

The capabilities of the present invention can be implemented in software, firmware, hardware or some combination thereof. In addition, the flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A method of managing chat histories comprising:
generating a transcript of an electronic discussion between at least two participants;
selectively saving the transcript on a computer terminal of one of the at least two participants, the one of the at least two participants saving the transcript establishes a local computer terminal and the other of the at least two participants establishes a remote computer terminal;
prompting the at least one participant saving the transcript to provide a tag, the tag being designated as either a public tag or a private tag by the participant, the public tag being associated with the local computer terminal and the remote computer terminal, and the private tag being associated with only the local computer terminal; and
incorporating the tag into the transcript.

2. The method of claim 1, wherein upon selecting a private tag, the private tag is incorporated into the transcript, the transcript being saved in a memory on the local computer; and
wherein upon selecting a public tag, the public tag is pushed from the local computer terminal to the remote computer terminal.

3. The method of claim 2, further comprising:
prompting the other of the at least two participants to accept the public tag; and
incorporating the public tag into a transcript of the discussion on the remote computer.

4. The method of claim 1, further comprising:
searching for a keyword associated with the tag; and
selectively rendering one of a public tag cloud and a private tag cloud incorporating the keyword.

5. The method of claim 1, wherein information about the at least one participant establishing the tag is incorporated into the transcript.

* * * * *